Aug. 3, 1965 W. O. CLEARY 3,198,382
APPARATUS FOR DISPENSING NESTED CONTAINERS
Filed Oct. 14, 1963 4 Sheets-Sheet 1

INVENTOR.
WILLIAM O. CLEARY
BY

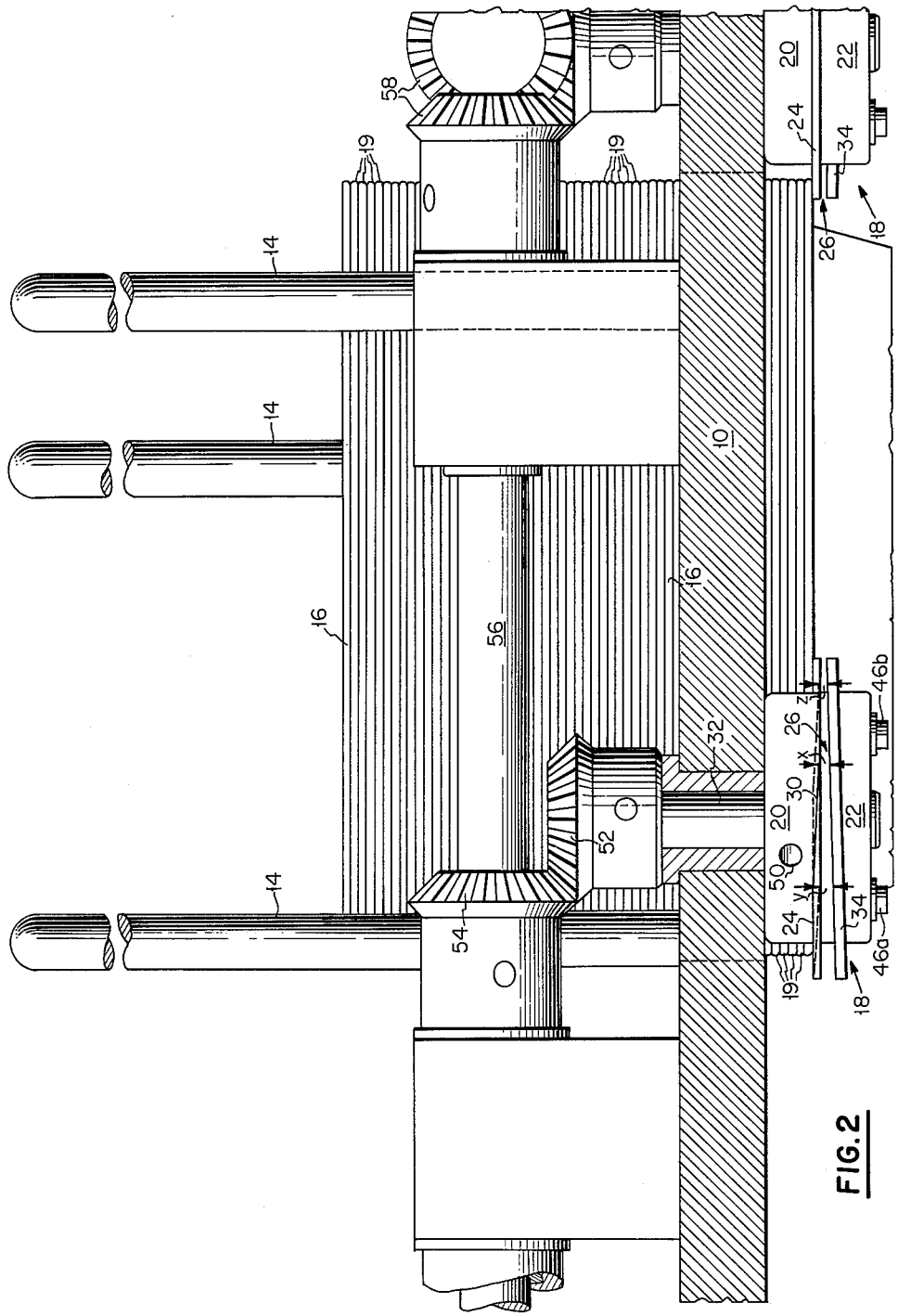

Aug. 3, 1965 W. O. CLEARY 3,198,382
APPARATUS FOR DISPENSING NESTED CONTAINERS
Filed Oct. 14, 1963 4 Sheets-Sheet 3

INVENTOR.
WILLIAM O. CLEARY
BY James E. Cosney
ATTORNEY

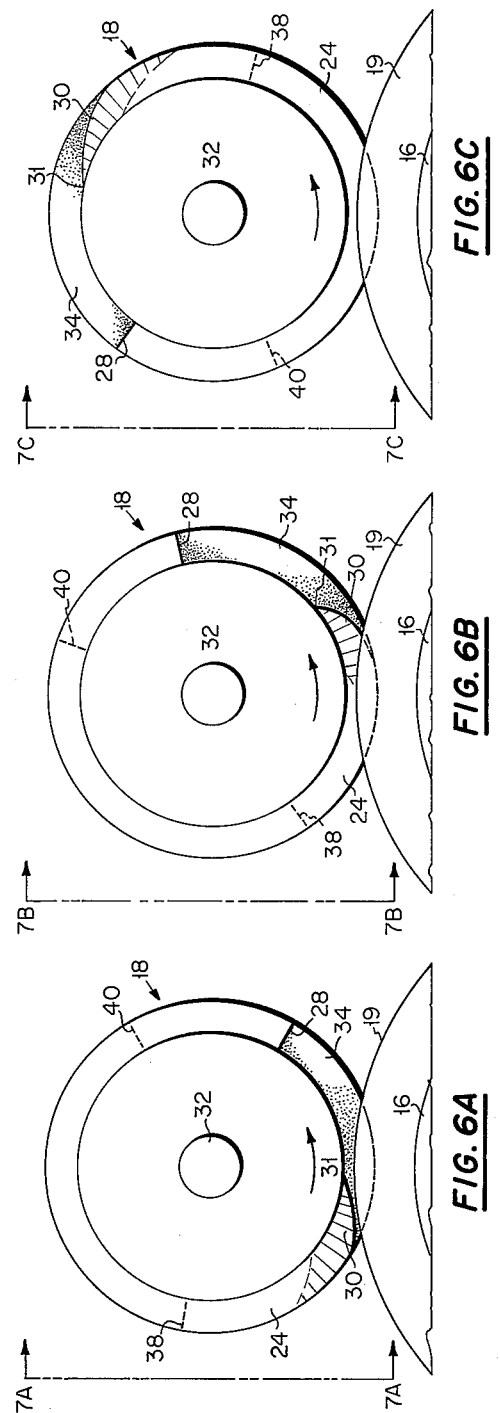

United States Patent Office 3,198,382
Patented Aug. 3, 1965

3,198,382
APPARATUS FOR DISPENSING NESTED CONTAINERS
William O. Cleary, 1230 Kenton Road, Deerfield, Ill.
Filed Oct. 14, 1963, Ser. No. 315,851
4 Claims. (Cl. 221—222)

The present invention relates to apparatus for dispensing nested containers individually from the bottom of a stack. More particularly the present invention relates to apparatus for dispensing nested containers of the type having circumferential rims or curls, such as the pie pans made from aluminum foil.

It is an object of the present invention to provide an improved apparatus for separating and dispensing nested containers individually from the bottom of a stack, and particularly to provide an apparatus of the type referred to that may readily be adjusted to operate dependably with nested containers that have rims and/or curls of different thickness.

This and other objects of the present invention will be apparent from the following description of the accompanying drawings which illustrate a preferred embodiment thereof and wherein FIGURE 1 is a plan view of a container-dispensing machine embodying the invention;

FIGURE 2 is a fragmentary front elevation, partly in section;

FIGURES 6A, 6B and 6C are plan views of the component shown in FIGURES 3, 4 and 5 illustrating different operational positions thereof in relation to a stack of nested containers; and FIGURES 7A, 7B and 7C are fragmentary side elevations illustrating the operational positions of the component shown in FIGURES 6A, 6B and 6C respectively.

Figure 1:
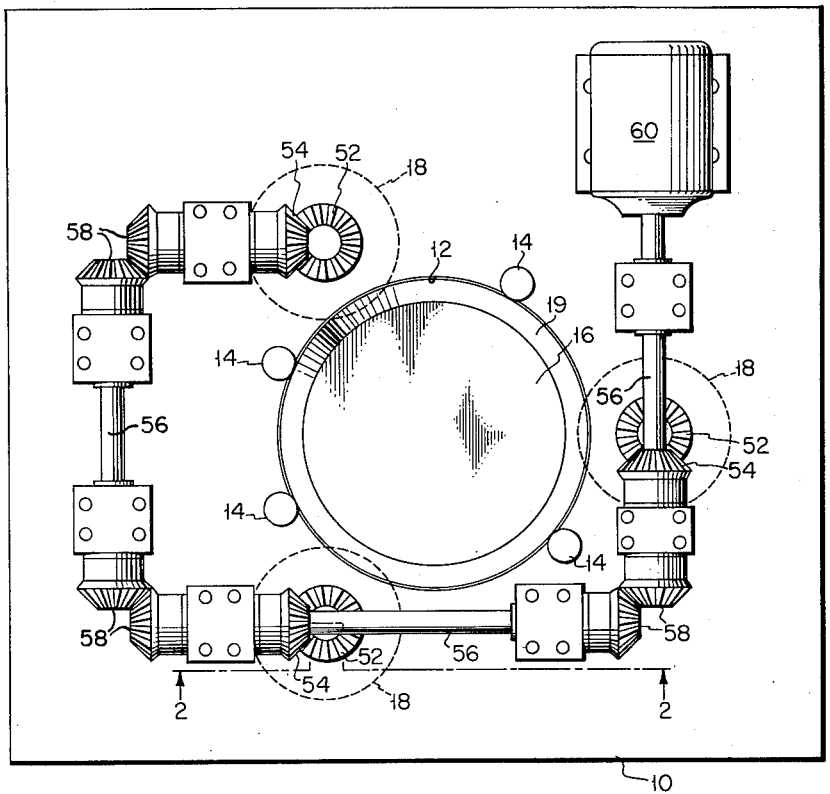

The apparatus of the invention comprises a base plate 10 containing a circular opening 12 of a size adapted to pass the containers to be dispensed. Mounted upon said plate adjacent the edge of said opening at circumferentially spaced points thereof are several vertical guide columns 14 between which a stack of nested containers 16 may be received. Rotatably supported at the bottom side of the base plate 10 adjacent the edge of opening 12 in spaces between the columns 14 are several mechanisms identified by the reference numerals 18 which project into the space defined by the opening 12. Said mechanisms support the rim 19 of the lowest container in a stack of nested containers placed between the guide columns and may be operated to separate with each revolution the lowermost container from the stack and dispense it onto a suitable carriage or conveyor (not shown) that may be located below the base plate 10, for conveyance of the containers to a place of use. The exemplary embodiment of the invention illustrated in the accompanying drawings possesses four guide columns 14 and three dispensing mechanisms 18. It will be understood that a dispensing apparatus embodying the invention may be equipped with more or less such guide columns 16 and with more or less container separating and dispensing mechanisms 18 without departing from the scope and spirit of the invention.

The container separating and dispensing mechanisms 18 are all of identical construction and operate in synchronism in an identical manner so that it will suffice to describe one of them in detail. Each of said mechanisms has an upper portion 20 which separates the lowermost container from the stack and a lower portion 22 which supports the stack temporarily as the upper portion separates the lowermost container from the stack and thereafter dispenses said separated container while the upper portion assumes temporarily the task of supporting the remaining stack.

Figure 5:
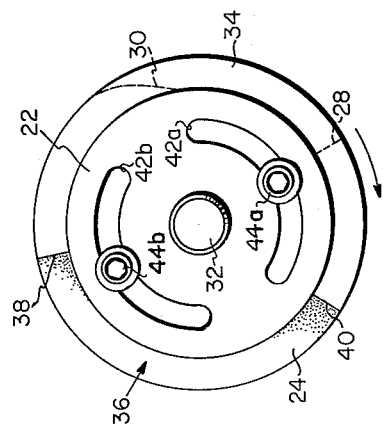
FIGURE 5 is a bottom view of the same component.
Figure 4:
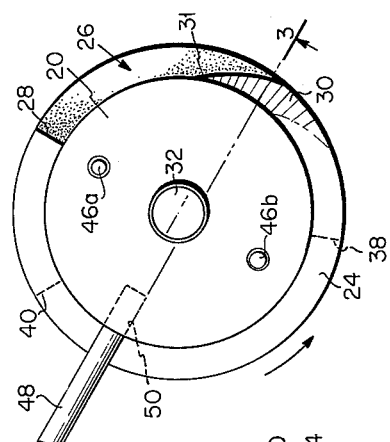
FIGURE 4 is a plan view of the component illustrated in FIGURE 3.
Figure 3:
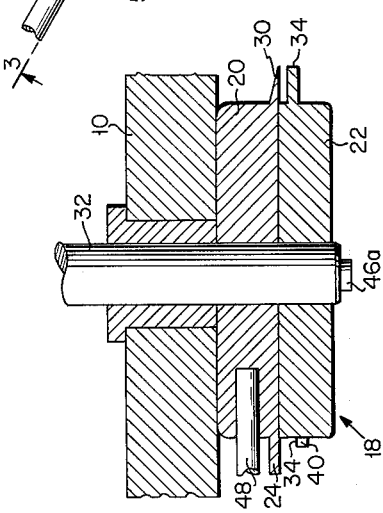
FIGURE 3 is a section through a component of the machine illustrated in FIGURES 1 and 2.

In the exemplary embodiment of the invention illustrated in the accompanying drawings the upper portion of the dispensing mechanism 18 is formed by a shallow centrally apertured cylindrical shank of limited depth which carries along its bottom edge a rib or flange segment 24 that lies in a horizontal plane and extends over about 270° of the circumference of said shank so that an open sector 26 (FIGURE 4) of about 90° is left between the end edges 28 and 30 of said flange segment 24. The leading end edge 30 of said flange, i.e., the end edge facing in the intended direction of rotation of the mechanism is formed into a sharp blade of wedge-shaped cross-sectional contour that starts with a point 31 adjacent the peripheral surface of the cylinder and widens gradually to the full radial depth of the flange (FIGURE 4). The shank 20 is loosely engaged over a short shaft 32 which is suitably journaled in the base plate 10 (FIGURE 2), and firmly secured to said shaft below the shank 20 is the lower portion 22 of the dispensing mechanism 18 which is likewise formed by a shallow cylindrical shank. Said lower shank carries near its upper edge a rib segment 34 that extends over about 225° of the circumference of said shank along a helical path leaving an open sector of about 135° between its trailing edge 38 and its leading edge 40 (FIGURE 5). The rib segment 34 declines from its leading edge toward its trailing edge, as best seen in FIGURE 2. The upper shank 20 is secured to the lower shank in a manner permitting adjustment of its rotary position relative to the lower shank within limits which maintain the blade 30 of the upper shank above the rib segment 34 of the lower shank, and for this purpose the lower shank is provided with a pair of oppositely located arcuate slots 42a and 42b that are engaged by headed screws 44a and 44b, respectively, which protrude into and engage tapped holes 46a and 46b provided in the upper shank 20. By loosening said screws 44a and 44b, inserting a lever arm 48 (FIGURE 4) into a radially extending hole 50 in the peripheral surface of the upper shank 20 and turning said shank on shaft 32 relative to the lower shank 22 the location of the blade 30 relative to the helical rib 34 of the lower shank 22 may be changed, and since the flange segment 24 and the rib segment 34 lie in converging planes the described change in the rotary position of the shanks 20 and 22 relative to each other varies the vertical distance between the edge 30 and the upper surface of said helical rib segment 34. The screws 44a and 44b may now be tightened again to hold the shanks 20 and 22, and hence blade 30 and rib segment 34 securely in their adjusted positions.

In practical operation the container separating and dispensing mechanisms comprised in the apparatus of the invention are turned in counter-clockwise direction as viewed from the top in such synchronism that corresponding points of their periphery pass through the planes determined by their respective center axes and the vertical center axis of opening 12 in base plate 10 simultaneously. To drive the dispensing mechanisms comprised in the apparatus, the shafts 32 of said mechanisms, may carry mitre gears 52 (FIGURE 2) that mesh with mitre gears 54 which are secured to horizontal shafts 56. The shafts 56 are rotatably supported from the base plate 10 exteriorly adjacent the guide columns 14 (FIGURE 1) and may be coupled for rotation in unison by sets of enmeshed mitre gears 58 that are secured to adjacent ends of the shafts 56 as shown in FIG. 1 so that all the container separating and dispensing mechanisms 18 may be driven from a common motor as schematically indicated at 60 in FIGURE 1.

When a stack of nested containers such as the stack of nested pie plates 16 shown in FIGURE 2, is dropped into the space between the guide columns 16, the rim 19 of its lowermost plate may come to rest upon the flange segments 24 of the upper shanks 20 of the mechanisms 18 but upon counterclockwise rotation of said mechanisms will invariably drop through the open sectors 26 of said flange segments onto the helical ribs 34 of the lower shanks 22 underneath (FIGURES 6A and 7A). Upon continued rotation of the separating and dispensing mechanisms 18 in counter-clockwise direction, the blades 30 formed at the leading edges of the flange segments 24 on the upper shanks 20 enter the interstice between the rim of the lowermost plate and the rim of the plate directly above the lowermost plate, and due to their wedge shape character these blades will separate the lowermost plate from the rest of the stack (FIGURES 6B and 7B), and in the process take over the support of the stack within the guide columns 18. The helical ribs 34 of the lower shanks 22 of the three mechanisms 18 comprised in the apparatus continue to support the separated plate until the continued rotation of said mechanisms withdraws the trailing edges 38 of said ribs from underneath the rim of said separated plate and permits the plate to drop through the open sectors 36 between the end edges of said ribs onto a cart or conveyor underneath (FIGURES 6C and 7C), and as the rotation of the mechanisms 18 continues, the trailing edges of the flange segments 24 of the upper shanks 20 are withdrawn from underneath rim of what is now the lowermost plate in the stack, and said stack drops onto, and is again supported by, the helical ribs 34 of the lower shanks 22 of the three separating and dispensing mechanisms comprised in the apparatus of the mechanisms comprised in the apparatus of the invention. Another identical plate separating and dispensing cycle in the operation of the apparatus has commenced.

From the above description of the operation of the container dispensing apparatus it will be apparent that for proper performance it is of critical importance that the separating blade 30 be inserted precisely into the minute interstice between the rims of the two lowermost containers. This means that the vertical distance between the edge of said blade 30 and the top surface of the helical rib 34 directly below said edge must equal the thickness of the rims of the nested containers. If this distance were too small, the blade would cut into the rim or curl of the lowermost container, and if it were too large, the blade would cut into the rim or curl of the container directly above the lowermost container. In either case the apparatus would fail to operate properly.

In practice the rim or curl thickness of different batches of containers of the type here under consideration is rarely precisely the same but is subject to small yet significant variations. In prior known dispensing apparatus of the type to which the present invention relates, it was therefore frequently necessary to go to the cumbersome and time-consuming task of disassembling the dispensing mechanisms to interpose shims of different thicknesses between the separating and dispensing components of the mechanisms to adapt these mechanisms to operation with batches of containers of different rim thicknesses. In the apparatus of the invention it is a simple matter, however, to adjust the separating and dispensing mechanisms for operation with containers of different rim thickness or curls of different diameters. It is merely necessary to loosen the screws 46a and 46b, insert an arm or lever 48 into the aperture 50 in the upper shank 20 and turn said upper shank in clockwise or counter-clockwise direction, as the case may be, to decrease or increase the level at which the separator blade 30 operates above the surface of the helical container supporting rib 34. Due to the fact that said rib slopes downwardly in a clockwise direction as viewed from the top while the flange segment 24 lies substantially in a horizontal plane, clockwise rotation of the upper shank 22 from the position marked $x$ in FIGURE 2 is effective to increase the space between the edge of the blade 30 and the helical rib directly below said blade as indicated at $y$ and counter-clockwise rotation of the shank 20 brings said edge closer to the upper surface of said rib as indicated at $z$. Upon proper adjustment of the distance between the edge of blade 28 and the top surface of the helical rib directly below said edge, the screws 46a and 46b are tightened and the apparatus is again ready for operation. Hence, in the apparatus of the present invention, it is a simple matter and does not require disassembly of the apparatus nor the exchange of component parts of the separating and dispensing mechanisms to adjust the apparatus very precisely to the varying thicknesses of the rims or curls of different batches of containers.

An advantageous embodiment of the invention has been disclosed and described by way of example. It will be understood that various changes may be made therein without departing from the spirit and scope of the invention.

What is claimed is:

1. In a dispensing apparatus for a stack of nested containers provided with rims the combination of a base element containing an opening of a size to allow passage of the containers therethrough and a plurality of synchronically driven container separating and dispensing mechanisms for supporting the stack of containers and for separating the lowermost container from the stack of containers, said mechanisms being disposed along the circumference of the opening in angularly spaced relation to each other, each mechanism comprising a shaft rotatably mounted in said base element, an upper shank member and a lower shank member mounted on said shaft, releasable securing means for adjustably mounting one of said shank members in any one of a given number of fixed positions on said shaft relative to the other of said shank members, an annular flange segment mounted on said upper shank and a helical rib segment mounted on said lower shank, a given portion of said flange segment always being disposed in a spaced and inclined plane relative to a given portion of said rib segment, whereby the vertical distance between the leading edge of the flange segment and the portion of the upper surface of the rib segment located directly below said leading edge can be varied upon the release of said one shank member securing means and a preselected rotational movement of said one of the shank members with respect to the other shank member so that the mechanisms can accommodate container rims of different thicknesses.

2. A combination dispensing and separating apparatus for a stack of nested containers provided with rims comprising the combination of a base element containing an opening of a size to allow passage of the containers which are being dispensed therethrough, a plurality of synchronically driven dispensing mechanisms for engaging the containers and for separating the lowermost container from the stack of nested containers, each of said mechanisms being disposed along the circumference of the opening in angular relationship to each other, each mechanism comprising a shaft rotatably mounted in the base element, an upper shank member releasably mounted upon said shaft, a lower shank member fixed to said shaft, said upper shank member being provided with a horizontally disposed flange segment, said lower shank member being provided with a helical rib segment generally disposed in vertical alignment with the flange segment of said upper shank member, one of said shank members being provided with at least one arcuate and vertically arranged slot and the other of said shank members being provided with a bore located in alignment with the said slot, adjustable pin means extending through the aligned bore and slot for releasably securing the upper shank member in a given one of a number of fixed positions on said shaft relative to the other shank member, whereby the vertical distance between the leading edge of the flange segment of the upper shank member and the portion of the upper surface of the rib segment of the lower shank member located directly below said leading edge can be varied upon a release of said pin means and a preselected rotary adjustment of the upper shank member relative to the lower shank member, so that said mechanisms can accommodate containers of varying thicknesses between the rib and flange segments thereof.

3. In a mechanism for use in separating and dispensing the lowermost container in a stack of nested containers, the combination of a shaft, upper and lower shank members mounted upon said shaft, one of said shank members being adjustably mounted on said shaft and the other shank member being fixed to said shaft, one of said shank members being provided with a flange segment, the other of said shank members being provided with a helical rib segment, means for adjusting said adjustably mounted shank member in a given one of a number of fixed positions relative to the other fixed shank member so as to adjust the vertical distance between the leading edge of the flange segment and the portion of the surface of the rib segment located in opposed relationship thereto so that the mechanism can accommodate itself to container rims of different thicknesses.

4. A dispensing and separating mechanism as set forth in claim 3 wherein said one of said shank members is provided with at least one vertically disposed arcuate slot and the other of said shank members is provided with a vertically disposed bore located in alignment with said arcuate slot and pin means projecting through the aligned bore and slot whereby upon release of said pin means one of the shank members may be adjusted and arranged in a given one of a number of fixed positions relative to the other shank member.

References Cited by the Examiner

UNITED STATES PATENTS

| | | | |
|---|---|---|---|
| 1,272,764 | 7/18 | Blankenhorn et al. | 221—222 |
| 1,950,382 | 3/34 | Benson | 221—297 |
| 2,037,752 | 4/36 | Bares | 221—223 |
| 2,721,002 | 10/55 | Smith | 221—222 |
| 2,840,963 | 7/58 | Osmond | 221—222 |
| 3,074,594 | 1/63 | Cheeley | 221—223 |

FOREIGN PATENTS

| | | |
|---|---|---|
| 889,085 | 12/43 | France. |
| 897,686 | 11/53 | Germany. |

RAPHAEL M. LUPO, *Primary Examiner.*

LOUIS J. DEMBO, *Examiner.*